United States Patent [19]
Didycz et al.

[11] 3,912,578

[45] Oct. 14, 1975

[54] APPARATUS FOR AND A METHOD OF PURIFYING WASTE FLUID

[75] Inventors: William J. Didycz, Whitehall Borough; Donald Glassman, Mount Lebanon Township, Allegheny County, both of Pa.

[73] Assignee: United States Steel Corporation, Pittsburgh, Pa.

[22] Filed: Aug. 2, 1974

[21] Appl. No.: 494,257

Related U.S. Application Data

[62] Division of Ser. No. 325,803, Jan. 22, 1973, abandoned, which is a division of Ser. No. 120,540, March 3, 1971, Pat. No. 3,790,448.

[52] U.S. Cl. ......... 159/20 R; 159/47 WL; 202/174; 203/14; 203/48; 203/71; 203/88
[51] Int. Cl.² B01D 1/100; B01D 1/26; B01D 3/02; B01D 3/06
[58] Field of Search ............ 159/20, 17, 1 RW, 4 A, 159/4 UM, 47 WL, 2, 45, 47 R; 202/174; 203/12, 14, 48, 22, 47, 25, 88, 71; 201/13, 27–30; 23/273; 122/5, 28

[56] References Cited
UNITED STATES PATENTS

| | | | |
|---|---|---|---|
| 1,714,168 | 5/1929 | Heller | 122/5 X |
| 1,848,818 | 3/1932 | Becker | 201/39 |
| 1,888,465 | 11/1932 | Miller | 201/30 X |
| 2,189,083 | 2/1940 | Renkin | 159/4 UM |
| 2,330,221 | 9/1943 | Kermer | 159/20 |
| 2,354,175 | 7/1944 | Wilcoxson | 23/262 |
| 2,385,955 | 10/1945 | Tomlinson | 23/131 |
| 2,524,753 | 10/1950 | Betts | 23/48 |
| 2,593,503 | 4/1952 | Tomlinson et al. | 23/48 |
| 2,631,926 | 3/1953 | Eckstrom | 23/273 |
| 2,739,039 | 3/1956 | Phelps | 23/129 |
| 2,739,044 | 3/1956 | Ashley et al. | 23/302 |
| 2,775,541 | 12/1956 | Karl | 203/14 X |
| 2,896,705 | 7/1959 | Ramen | 159/47 WL |
| 3,153,609 | 10/1964 | Markant et al. | 162/36 |
| 3,248,181 | 4/1966 | Akimoto | 159/45 |
| 3,299,942 | 1/1967 | Jacoby | 159/17 R |
| 3,323,575 | 6/1967 | Greenfield | 159/13 A |
| 3,332,470 | 7/1967 | Chirico et al. | 159/47 R |

Primary Examiner—Jack Sofer
Attorney, Agent, or Firm—William L. Krayer

[57] ABSTRACT

A frontward flow and backward flow method of and apparatus for purifying waste fluid containing waste water and corrosive salts with high temperature steam from a continuous coke quenching apparatus to produce substantially pure salt-free condensate are disclosed.

20 Claims, 5 Drawing Figures

APPARATUS FOR AND A METHOD OF PURIFYING WASTE FLUID

This is a division, of application Ser. No. 325,803, filed Jan. 22, 1973 now abandoned, which in turn is a division of application Ser. No. 120,540, filed Mar. 3, 1971, now U.S. Pat. No. 3,790,448.

A. The backward flow method of purifying waste fluid containing waste water and corrosive salts, produced in a coke producing apparatus and normally utilized to quench coke in a coke quenching apparatus, with waste steam from the coke quenching apparatus to produce substantially salt free condensate, comprises the steps of:
  a. vaporizing the waste fluid at a first predetermined temperature at a first predetermined pressure to vaporize a portion of the waste fluid and to concentrate the corrosive salts in the residual waste fluid to form a concentrate;
  b. heating the concentrate in heat exchange relationship with either high temperature steam or the waste steam at a second predetermined temperature at a second predetermined pressure, the second predetermined pressure being greater than the first predetermined pressure;
  c. vaporizing the concentrate at the second predetermined temperature at the second predetermined pressure to vaporize a second portion of the concentrate and to concentrate the corrosive salts to form a second concentrate;
  d. condensing the second vaporized portion and the steam to form substantially salt free condensate; and
  e. utilizing the substantially salt free condensate in an industrial application, thereby eliminating the disposal of the waste fluid and the contamination of the atmosphere with the waste fluid if the waste fluid were employed to quench the coke in the coke quenching apparatus, and utilizing the waste steam for a useful purpose.

B. The apparatus for purifying waste fluid containing waste water and corrosive salts, produced in a coke producing apparatus and normally utilized to quench coke in a coke quenching apparatus, with waste steam from the coke quenching apparatus to produce substantially salt free condensate has:
  a. a heat exchanger for heating the waste fluid in heat exchange relationship with the waste steam at a first predetermined temperature at a first predetermined pressure;
  b. vaporizing means for vaporizing the heated waste fluid at the first predetermined temperature at the first predetermined pressure to vaporize a portion of the waste fluid and to concentrate the corrosive salts to form a concentrate, the first predetermined pressure being lower than the pressure of the waste steam at essentially atmospheric pressure from the coke quenching apparatus;
  c. condensing means for condensing the heated vaporized portion of the waste fluid and the waste steam to form substantially salt free condensate; and
  d. means for utilizing the substantially salt free condensate for an industrial application thereby eliminating the disposal of the waste fluid and the contamination of the atmosphere with the waste fluid if the waste fluid were employed to quench the coke in the coke quenching apparatus, and utilizing the waste steam for a useful purpose.

C. A backward flow apparatus for the backward flow purification of waste fluid containing waste water and corrosive salts, produced in a coke producing apparatus and normally utilized to quench coke in a coke quenching apparatus, with waste steam from the coke quenching apparatus to produce substantially pure salt free condensate has:
  a. vaporizing means for vaporizing the waste fluid at a first predetermined temperature at a first predetermined pressure to vaporize a portion of the waste fluid and to concentrate the corrosive salts to form a concentrate;
  b. a heat exchanger for heating the concentrate in heat exchange relationship with either high temperature steam or the waste steam, at a second predetermined temperature at a second predetermined pressure, the second predetermined pressure being greater than the first predetermined pressure;
  c. another vaporizing means for vaporizing the concentrate at the second predetermined temperature at the second predetermined pressure to vaporize a second portion of the concentrate and to concentrate the corrosive salts to form a second concentrate;
  d. condensing means for condensing the second vaporized portion and the steam to form substantially salt free condensate; and
  e. means for utilizing the substantially salt free condensate for an industrial application, thereby eliminating the disposal of the waste fluid and the contamination of the atmosphere with the waste fluid if the waste fluid were employed to quench the coke in the coke quenching apparatus, and utilizing the waste steam for a useful purpose.

BACKGROUND OF THE INVENTION

Heretofore, severe atmospheric corrosion of structures, buildings, and process equipment has occurred at coke processing plants for many years. The problem has recently become more critical as a result of the installation of additional chemical processing facilities thus placing a high concentration of complex process equipment in an area exposed to this atmospheric corrosion. A major cause of this problem is the use of aqueous waste streams to quench the coke. These waste streams contain dissolved inorganic-salts that become air-borne with the steam produced in the quenching operation, and subsequently upon cooling, rain out of the atmosphere on adjacent buildings and equipment. Unfortunately, these salts are very corrosive to structures, buildings, and process equipment that are in the path of this salt fall-out. This situation has been tolerated because no economically-attractive alternative method of disposing these waste streams was available. Disposal of the aqueous waste streams in a deep well has been considered and is being practiced in some coke plants. However, deep well disposal at some coke processing plants requires a disposal well of about 19,000 feet; and the probability of such a well being able to handle the large volume of water has been reported to be fifty percent. Further, a danger exists that underground streams will be contaminated by this method of waste disposal.

OBJECTS OF THE INVENTION

It is the general object of this invention to avoid and overcome the foregoing and other difficulties of and objections to prior art practices by the provision of an improved apparatus for and method of purifying waste fluid containing waste water and corrosive salts with waste steam at essentially atmospheric pressure from a continuous coke quenching apparatus to produce substantially pure salt free condensate, which improved apparatus and method:

a. utilize the heretofore wasted steam from a continuous coke quenching operation to produce the salt free condensate;

b. produce substantially salt free condensate for use in boilers or as coke quenching fluid;

c. eliminate the corrosive atmosphere polluting effluent produced in coke quenching operations by the use of contaminated waste fluid from the coking operation as a coke quenching fluid;

d. eliminate suspended tar particles from the waste fluid;

e. eliminate benzene, tar acids, tar bases, and oil from the waste fluid;

f. eliminate $CO_2$, $NH_3$, $H_2S$ and benzene from the waste fluid; and g. eliminate corrosive salts from the waste fluid.

BRIEF SUMMARY OF THE INVENTION

The aforesaid objects of this invention, and other objects which will become apparent as the description proceeds, are achieved by providing an improved (frontward and backward flow) apparatus for and method of purifying waste fluid containing waste water and corrosive salts with waste steam from a coke quenching apparatus to produce substantially pure salt free condensate.

D. The backward flow method of purifying waste fluid containing waste water and corrosive salts, produced in a coke producing apparatus and normally utilized to quench coke in a coke quenching apparatus, with waste steam from the coke quenching apparatus to produce substantially salt free condensate, comprises the steps of:

a. vaporizing the waste fluid at a first predetermined temperature at a first predetermined pressure to vaporize a portion of the waste fluid and to concentrate the corrosive salts in the residual waste fluid to form a concentrate;

b. heating the concentrate in heat exchange relationship with either high temperature steam or the waste steam at a second predetermined temperature at a second predetermined pressure, the second predetermined pressure being greater than the first predetermined pressure;

c. vaporizing the concentrate at the second predetermined temperature at the second predetermined pressure to vaporize a second portion of the concentrate and to concentrate the corrosive salts to form a second concentrate;

d. condensing the second vaporized portion and the steam to form substantially salt free condensate; and e. utilizing the substantially salt free condensate in an industrial application, thereby eliminating the disposal of the waste fluid and the contamination of the atmosphere with the waste fluid if the waste fluid were employed to quench the coke in the coke quenching apparatus, and utilizing the waste steam for a useful purpose.

E. The apparatus for purifying waste fluid containing waste water and corrosive salts, produced in a coke producing apparatus and normally utilized to quench coke in a coke quenching apparatus, with waste steam from the coke quenching apparatus to produce substantially salt free condensate has:

a. a heat exchanger for heating the waste fluid in heat exchange relationship with the waste steam at a first predetermined temperature at a first predetermined pressure;

b. vaporizing means for vaporizing the heated waste fluid at the first predetermined temperature at the first predetermined pressure to vaporize a portion of the waste fluid and to concentrate the corrosive salts to form a concentrate, the first predetermined pressure being lower than the pressure of the waste steam at essentially atmospheric pressure from the coke quenching apparatus;

c. condensing means for condensing the heated vaporized portion of the waste fluid and the waste steam to form substantially salt free condensate; and d. means for utilizing the substantially salt free condensate for an industrial application thereby eliminating the disposal of the waste fluid and the contamination of the atmosphere with the waste fluid if the waste fluid were employed to quench the coke in the coke quenching apparatus, and utilizing the waste steam for a useful purpose.

F. A backward flow apparatus for the backward flow purification of waste fluid containing waste water and corrosive salts, produced in a coke producing apparatus and normally utilized to quench coke in a coke quenching apparatus, with waste steam from the coke quenching apparatus to produce substantially pure salt free condensate has:

a. vaporizing means for vaporizing the waste fluid at a first predetermined temperature at a first predetermined pressure to vaporize a portion of the waste fluid and to concentrate the corrosive salts to form a concentrate;

b. a heat exchanger for heating the concentrate in heat exchange relationship with either high temperature steam or the waste steam, at a second predetermined temperature at a second predetermined pressure, the second predetermined pressure being greater than the first predetermined pressure;

c. another vaporizing means for vaporizing the concentrate at the second predetermined temperature at the second predetermined pressure to vaporize a second portion of the concentrate and to concentrate the corrosive salts to form a second concentrate;

d. condensing means for condensing the second vaporized portion and the steam to form substantially salt free condensate; and e. means for utilizing the substantially salt free condensate for an industrial application, thereby eliminating the disposal of the waste fluid and the contamination of the atmosphere with the waste fluid if the waste fluid were employed to quench the coke in the coke quenching apparatus, and utilizing the waste steam for a useful purpose.

BRIEF DESCRIPTION OF THE SEVERAL VIEWS OF THE DRAWINGS

For a better understanding of this invention, reference should be had to the accompanying drawings, wherein like numerals of reference indicate similar parts through the several views and wherein.

Although the principles of this invention are broadly applicable to an apparatus for and a method of purifying waste fluid with steam generated from a continuous coke quenching apparatus, this invention is particularly adapted for use in conjunction with apparatus for and a method of purifying waste fluid containing waste water and corrosive salts with steam from a continuous rotary coke quenching apparatus, and hence it has been so illustrated and will be so described.

DETAILED DESCRIPTION

Figure 1:
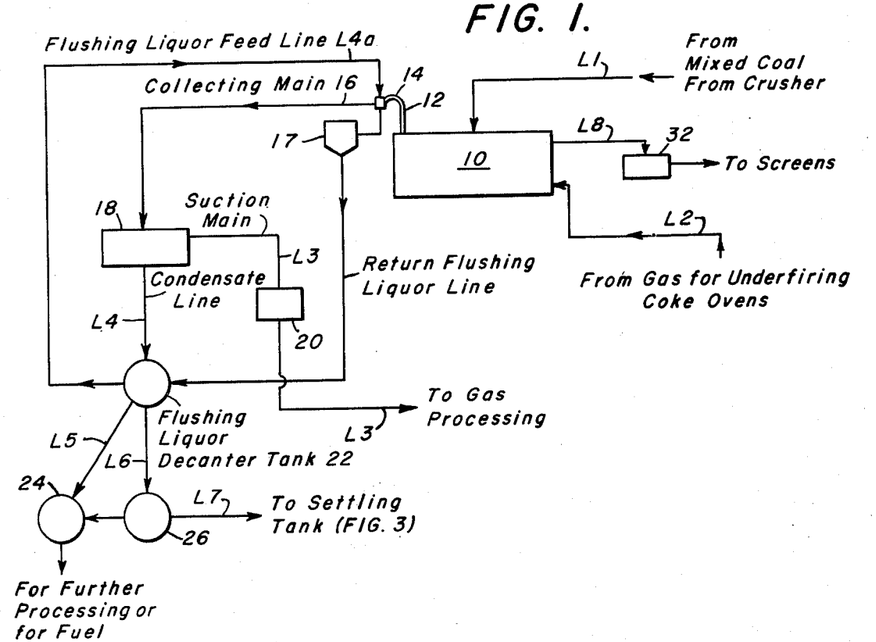
FIG. 1 is a diagrammatic view of a portion of a coke plant showing the production of raw gas and waste fluid during the coke manufacturing operation.

With specific reference to the form of this invention illustrated in the drawings and referring particularly to FIG. 1, a battery of coke ovens is indicated generally by the reference numeral 10.

WASTE FLUID PRODUCTION

The battery 10 (FIG. 1) receives mixed coal from a crusher (not shown) as indicated by the line L1. Gas for underfiring the coke ovens is supplied to the battery 10 (FIG. 1) of coke ovens via the line 12. The volatile products from the coal being processed into coke 36 (FIG. 2) within the battery 10 of coke ovens, exits from the battery 10 via ascension pipe 12 (FIG. 1) and goose neck 14, and enters a collecting main 16. This collecting main 16 (FIG. 1) carries the raw gas and condensate to a primary cooler 18.

Such primary cooler 18 may be either of the direct or indirect type. For example, a direct primary cooler (not shown) has a scrubbing tower provided with baffles and has its top portion equipped with a series of spray nozzles, all not shown. The lower portion of the primary cooler 18 contains a chamber to collect the condensate and liquor.

Figure 3:
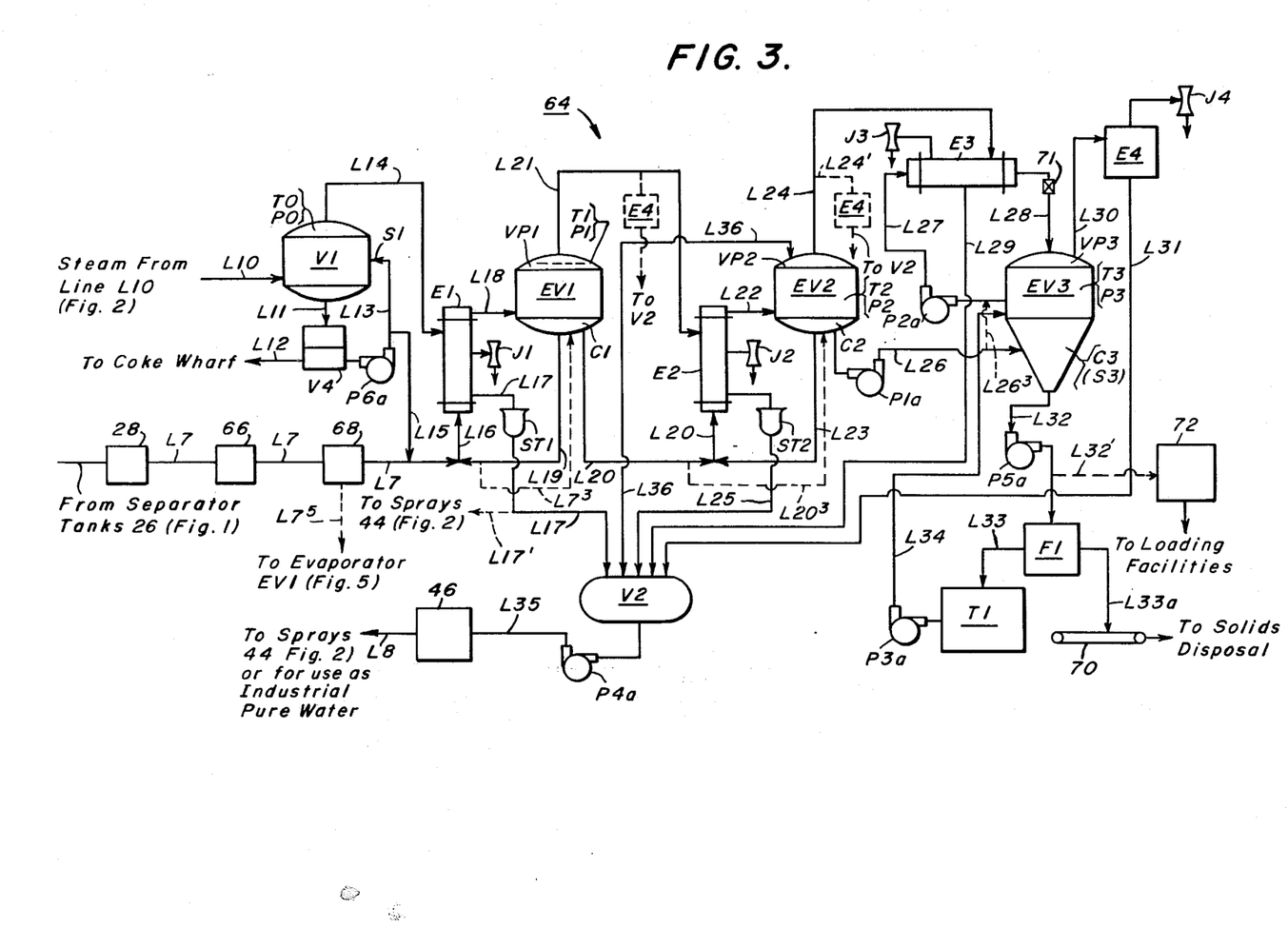
FIG. 3 is a diagrammatic view of one embodiment of the novel apparatus of this invention for purifying the waste fluid from the coke manufacturing operation.

The cooled gas from primary cooler 18 (FIG. 1) is exhausted by an exhauster, such as a fan 20 or the like, through a suction main L3 and is directed as indicated by the arrow in FIG. 1 to further gas processing and chemical recovery equipment (not shown). The liquor and condensate exit from the primary cooler 18 via a condensate line L4 into a flushing liquor decanter tank 22. This tank 22 is inclined at one end to facilitate the removal of solid accumulations. The tar and flushing liquor enter the decanter 22 and flow into a trough (not shown), which trough is operable to minimize agitation of the mixture in the decanter tank 22. The mixture overflows the trough into the compartment (not shown) where the velocity of the mixture is reduced to permit the tar (having a higher specific gravity than the flushing mixture) to settle to the bottom of the compartment from whence it exits via line L5 to tar storage tanks 24, where it is stored preparatory for further processing or for use as fuel. The flushing liquor flows over a fixed wier at the opposite end of the decanter tank 22 (FIG. 1) and is conducted via line L6 to separation tanks 26 preparatory for its transmission via line L7 to a settling tank 28, (FIG. 3).

The flushing liquor is returned via line L4a (FIG. 1) to the junction of the goose neck 14, the collecting main 16, and a line L4b leading to a downcomer 17, which downcomer 17 is connected via a return flushing liquor line L4c to the flushing liquor decanter tank 22.

The liquor which leaves the separation tanks 28 is a waste fluid containing waste water and corrosive salts, suspended material and the like, and having, for example, the following approximate composition shown in Table I below:

TABLE I

| Compound | Coke Oven Waste Fluid Lbs/Hr. |
|---|---|
| + $CO_2$ | 640 |
| + $NH_3$ | 461 |
| Water | 273,840 |
| × Tar acids (phenol, metal, para cresols, etc.) | 295 |
| × Tar bases (quinolins, etc.) | 55 |
| × Oil | 18 |
| ⊗ Tar | 223 |
| $NH_4Cl$ | 1,417 |
| $(NH_4)_2SO_4$ | 414 |
| Other salts | 304 |
| | 227,667 |

Note: Removed by
× benzene extraction
± distillation
⊗ settling tank, benzene bubbler The coke 36 (FIG. 2) is pushed from the battery 10 (FIG. 1) of coke ovens in the conventional manner into quencher cars 30 (FIG. 2) and is transmitted as indicated by the diagrammatic line L8 in FIG. 1 to a quenching station 32, where a continuous quenching device such as, for example, a continuous rotary quencher 32 (FIG. 2) of the type manufactured by Salem Brosius Company, Pittsburgh, Pennsylvania, is employed to quench the coke 36 and to produce the steam utilized in the subject invention.

CONTINUOUS QUENCHER 32

The quencher 32 (FIG. 2) is disposed in a pit 34, substantially below ground level. The coke 36 (FIG. 2) in the quencher car 30 is dumped into a hopper 38, which hopper 38 feeds the coke 36 onto a rotary table 40 where the rabbles 42 spread out the hot coke 36 over the rotating table 40 so that substantially pure quenching fluid (produced by this invention) in line L8 (FIGS. 2, 3) enters sprays 44 for the cooling and/or quenching of the hot coke 36 on the table 40. This substantially salt-free cooling fluid is supplied by line L8 (FIGS. 2 and 3), which line L8 extends from a distillation tower 46 shown in FIG. 3 and employed as hereinafter explained.

Figure 2:
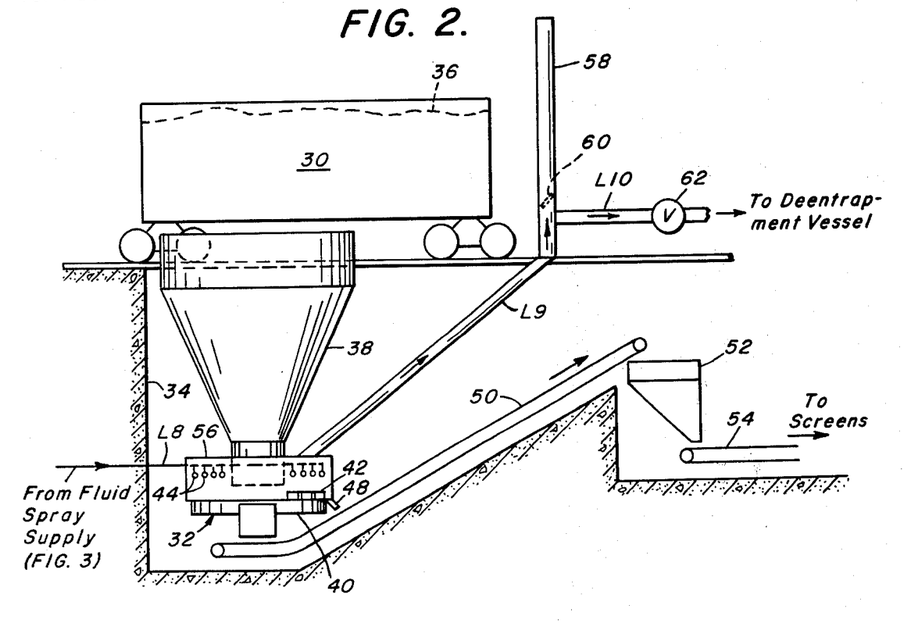
FIG. 2 is a diagrammatic side elevational view of a continuous rotary coke quenching apparatus showing the production of steam from the coke quenching operation for use in method of and apparatus for purifying the waste fluid from the coke manufacturing operation.

The quenched coke 36 is conductive via a chute 48 (FIG. 2) onto a conveyor 50, which conveyor 50 transports the coke 36 to a surge bin 52 from whence such coke is distributed onto another conveyor 54 for transport to screening devices (not shown in FIGS. 1 and 2).

STEAM PRODUCTION

The steam produced from the quenching operation is collected within a hood 56 (FIG. 2) of the continuous rotary quencher 32 and is conducted by a steam line L9 to a steam stack 58. This steam stack 58 has a damper or valve 60 for directing the flow of steam either through the steam stack 58 or through a steam line L10 via a valve 62 to a deentrainment vessel V1 (FIG. 3) of the apparatus 64 (FIG. 3) for purifying the waste fluid in line L7 (FIGS. 1, 3) with the high temperature steam in line L10 (FIGS. 2, 3) from the continuous coke quenching apparatus 32 to produce substantially salt-free condensate.

APPARATUS 64

First Stage

The steam in line L10 (FIGS. 2, 3) at approximately 400°F and at about 14.1 psia pressure enters the deentrainment vessel V1 (FIG. 3) where coke breeze (i.e., coke particles) is removed by sprays S1. The coke breeze is collected via line L11 (FIG. 3) in a dewatering vessel V4 and fed via line L12 to, for example, a coke wharf (not shown) for further processing. A pump P6a (FIG. 3) pumps water from the dewatering vessel V4 for the spray S1 via line L13 into the deentrainment vessel V1. The now relatively clean steam (freed of suspended coke breeze) is conducted via line L14 (FIG. 3) at a temperature of about 200°F to a first heat exchanger E1.

Meanwhile, the waste fluid or liquid in line L7 (FIGS. 1, 3) passes through the settling tank 28 (FIG. 3) where suspended tar particles are removed therefrom; is then bubbled through or contacted with a layer of liquid containing light oil, benzene, or the like in a contacting vessel 66 to remove tar particles which have been suspended in the form of small droplets in the waste fluid; and then through a liquid extraction tower 68 (FIG. 3), where dissolved phenol and other organics in the waste fluid are removed.

It will be noted from a consideration of FIG. 3 that the branch line L15 from line L13 dilutes the waste fluid in line L7 with water pumped thereto by pump P6a. The watered waste fluid enters the tube liquid side of heat exchanger E1 via line L16.

The steam in line L14 (FIG. 3) is sucked into, for example, the shell side of the heat exchanger E1 by a steam jet J1 and the waste fluid in line L7 is pumped into the tube liquid side of the heat exchanger E1 by a pump (not shown). The waste fluid is heated in heat exchange relationship with the steam (at a temperature $T_o$ of about 200°F and a pressure $P0$ of about 13.8 psia) in the heat exchanger E1 to a first predetermined temperature T1 of about 186°F at a first predetermined pressure P1, such as about 8.72 psia. The cooled condensate from the steam in heat exchanger E1 exits therefrom via line L17 (FIG. 3) through a steam trap ST1 and is collected in a condensate drum V2 (FIG. 3) maintained at a pressure of about 5.1 psia. Such condensate collects in the form of substantially salt-free condensate. Alternatively, as shown by the dotted line L17' (FIG. 3) this condensate can be sent directly to the sprays 44 (FIG. 2), thereby insuring that the remaining condensate in condensate drum V2 is a high quality water suitable for use as substantially pure industrial water.

The now heated waste fluid in heat exchanger E1 (FIG. 3) exits from the heat exchanger E1 via line L18 into an evaporator EV1 where such heated waste fluid is vaporized at the first predetermined temperature T1 of about 186°F and at a first predetermined pressure P1 of about 8.72 psia to form a vaporized portion VP1 (FIG. 3) of the waste water and to concentrate the corrosive salts in the residual waste fluid to form a concentrate C1 (FIG. 3) having about 1.96 percent by weight of corrosive salts. The concentrate C1 is refed via line L19 in a natural circulation loop back via line L16 to the heat exchanger E1. Another portion of the concentrate C1 is fed via line L20 to, for example, the tube side of a second heat exchanger E2.

Second Stage

The vaporized portion VP1 of the waste water (containing steam, ammonia and dissolved gases, such as $CO_2$, $H_2S$ and the like) exits from the first evaporator EV1 (FIG. 3) via line L21 to, for example, the shell side of the second heat exchanger E2. It will be understood by those skilled in the art that alternatively the line L21 (FIG. 3) may conduct the vaporized portion VP1 of the waste water to a condenser E4 and thence to the condensate drum V2 as shown by the dotted lines in FIG. 3. The second predetermined pressure P2 of about 5.1 psia in evaporator EV2 (FIG. 3) is lower than the first predetermined pressure P1 of about 8.72 psia in the evaporator EV1.

In the second heat exchanger E2 (FIG. 3), the vaporized portion VP1 of the waste water (carried by line L21, FIG. 3) at about 182°F and about 8.7 psia heats the concentric C1 of the waste fluid in heat exchange relationship at a second predetermined temperature T2 of about 162°F at a pressure of about 5.1 psia in the heat exchanger E2. A line L22 conducts the heated concentrate C1 (mixed with the second concentrate C2 from evaporator EV2 via line L23) at the temperature T2 of about 162°F to a second evaporator EV2 where the heated mixture of the concentrates C1, C2 is vaporized at a second predetermined pressure P2 of about 5.1 psia and at the temperature T2 of about 162°F to produce a second vaporized portion VP2 (FIG. 3) and to further concentrate the corrosive salts in the evaporator EV2 to form a second concentrate C2 having by weight about 3.8 percent corrosive salts.

In the natural circulation system associated with the heat exchanger E2 (FIG. 3) and the evaporator EV2, the line L23 (FIG. 3) conducts or recirculates the concentrate C2 back via the line L20 to the heat exchanger E2. The vaporized portion VP2 (FIG. 3) in evaporator EV2 exits from the evaporator EV2 via line L24 to a third heat exchanger E3. A line L25 (FIG. 3) conducts a condensed portion of the second vaporized portion VP2 from the heat exchanger E2 (FIG. 3) to the condensate drum V2 where it collects as substantially salt-free condensate. As shown in FIG. 3, equilizer line L36 maintains the pressure in condensate drum V2 at the same pressure as that in second evaporator EV2.

A pump P1a (FIG. 3) pumps the concentrate C2 from the second evaporator EV2 via line L26 to an evaporator crystallizer EV3 of the type, for example, known as a Krystal crystallizer. Such evaporator crystallizer EV3 is manufactured by Struthers-Wells Corporation, Warren, Pennsylvania. The evaporators EV1 and EV2 are of the type, for example, manufactured by Swenson-Walker Corporation, Whiting, Indiana.

Third Stage

The vaporized portion VP2 in line L24 (FIG. 3) is at a temperature of about 162°F and at a pressure of about 5.1 psia. A portion of concentrate C3 in evaporator crystallizer EV3 is pumped by a pump P2a through a line L27, (FIG. 3, in the forced circulation system having restrictive orifice 71 in line L28 and associated with the heat exchanger E3 and the crystallizing evaporator EV3) and into, for example, the tube side of the heat exchanger E3. In the heat exchanger E3, the concentrate C3 is heated by condensation of the second vaporized portion VP2, which portion VP2 is fed from line L24 (FIG. 3) to, for example, the shell side of the heat exchanger E3. The concentrate C3 is heated to about 132°F at a pressure corresponding to the vapor pressure of the third concentrate C3 in evaporator EV3. It will be understood that in order to suppress vaporization and present subsequent crystallization of the third concentrate C3 in heat exchanger E3, the restrictive orifice 71 produces a higher pressure in heat exchanger E3 than the pressure P3 in evaporator EV3. A return line L28 (FIG. 3) from the heat exchanger E3 returns the heated concentrate C3 to the evaporator crystallizer EV3, where such heated concentrate C3 is vaporized at a third predetermined pressure P3 of about 1.35 psia and at a temperature T3 of about 124°F to produce a third vaporized portion VP3 and to further concentrate the corrosive salts to form a third concentrate C3 that is a saturated solution S3 of about 39.1 percent by weight of corrosive salts. A condensate line L29 (FIG. 3) from heat exchanger E3 conducts the condensate from the second vaporized portion VP2 to the condensate drum V2.

The vaporized third portion VP3 from the evaporator crystallizer EV3 exits via line L30 (FIG. 3) to the condenser E4 where such third vaporized portion VP3 is condensed and conducted by line L31 to the condensate drum V2. Depending on the elevation of the condenser E4 above condensate drum V2, a pump (not shown) may be required to transfer the condensate from vaporized third rotary VP3.

The corrosive salt removing loop shown in the lower right-hand portion of FIG. 3 has a line L32 in which a pump P5a conducts the saturated solution S3 of the corrosive salts through a filter F1 where the concentrated or saturated solution S3 containing about 25 percent solid salt crystals is filtered. The filtered liquid from the filter F1 is conducted by a line L33 to a tank T1 and pumped back by a pump P3a through line L34 to the evaporator crystallizer EV3. The salt crystals in the filter F1 containing about 7.5 percent water are discharged via line L33a (FIG. 3) from the filter F1 onto a conveyor 70, which conveyor 70 transports them to a solid disposal station (not shown).

Alternatively, as shown by the dotted lines L32' in FIG. 3, the pump P5a may pump the saturated solution S3 in line L32, (FIG. 3) into a salt solution storage tank 72 for storage preparatory to its release to loading facilities (not shown) and ultimate disposal or futher processing into salt products.

The substantially salt-free condensate collected in condensate drum V2 (FIG. 3) is pumped by a pump P4a via line L35 to the distillation tower 46 (FIG. 3) where ammonia, carbon dioxide, hydrogen sulfide, benzene, or the like are removed from such condensate. The now substantially salt-free condensate is fed via line L8 (FIGS. 2, 3) to the spray 44 (FIG. 2) of the continuous rotary quencher 32, shown in FIG. 2, or to other batch type coke quenching operations. The water product from this process may be made suitable for use as industrial pure water, such as boiler feed water or the like by diverting the condensate in dotted line L17' (FIG. 3) away from condensate drum V-2.

The material balance of the above described apparatus 64 (FIG. 3) is shown in Table II below:

TABLE II

Material Balance

| Stream No. | Approximate Flow lbs./hr. | GPM | Approximate Steam Analysis, wt% |
|---|---|---|---|
| L7 | 450,000 | 900 | 98.67% water, 1.33% salts |
| L14 | 160,300 | | Steam from quenching 3550 ton per day of coke |
| L20 | 306,600 | 617 | 98.04% water, 1.96% salts |
| L21 | 143,400 | | Steam |
| L26 | 157,800 | 316 | 96.20% water, 3.80% salts |
| L24 | 150,800 | | Steam |
| L28 | 29,000,000 | 50,000 | 60.9% water, 39.1% salts plus crystals |
| L32 | 24,800 | 41 | 60.9% water, 39.1% salts plus crystals |
| L33a | 6,450 | | Salt crystals plus 7.5% water |
| L33 | 18,150 | 31 | 60.9% water, 39.1% salts plus crystals |
| L36 | 1,980 | | Steam |
| L35 | 604,300 | 1,240 | Water (very low salt content) |
| L30 | 151,800 | | Steam |
| L12 | 150 | | Coke breeze (fluid containing coke particles) |

ALTERNATIVE EMBODIMENTS

Figure 4:
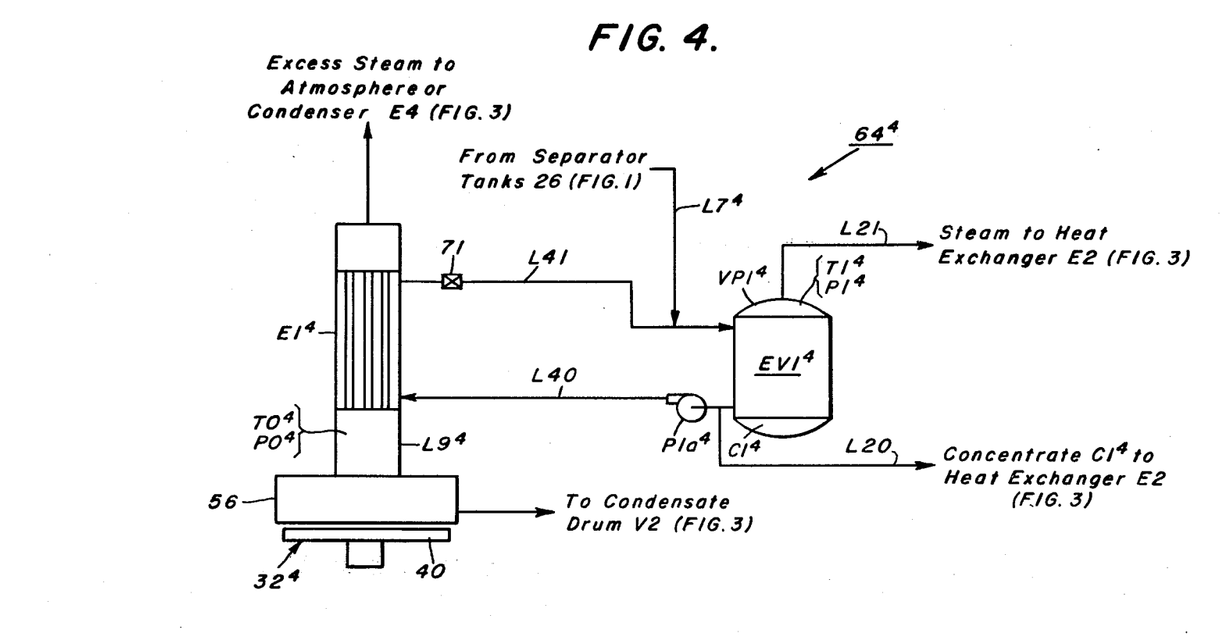
FIG. 4 is a fragmentary diagrammatic view of an alternative embodiment of the first stage of the apparatus shown in FIG. 3 and showing the steam generated in the continuous rotary coke quenching apparatus directly flowing to the first heat exchanger of the first stage of the improved apparatus.

It will be understood by those skilled in the art that alternatively as shown in the apparatus $64^4$ of FIG. 4, the high temperature steam from the continuous rotary quencher $32^4$ may exit from the hood 56 via steam line $L9^4$ into heat exchanger $E1^4$. The contaminated waste fluid or water from the separator tanks 26 (FIG. 1) enters the first heat exchanger evaporator $E1^4$ via line $L7^4$. A pump $P1a^4$ pumps such waste fluid through line L40 into the heat exchanger $E1^4$ where the steam at a temperature $T0^4$ of about 400°F and at a pressure $P0^4$ of about 14.1 psia raises the waste fluid to a temperature of about 225°F. A line L41 conducts the now heated waste fluid back to the first evaporator EV1⁴ where, at the temperature T1⁴ of about 186°F and at a pressure P1⁴ of about 8.72 psia, the first stage of the vaporizing cycle is performed.

Alternatively, evaporator EV1⁴ can be integrated with heat exchanger E1⁴ to use the waste steam from either a continuous coke quencher 32 or a batch type quenching apparatus (not shown).

BACKWARD FLOW SYSTEM

Two Stage

Figure 5:
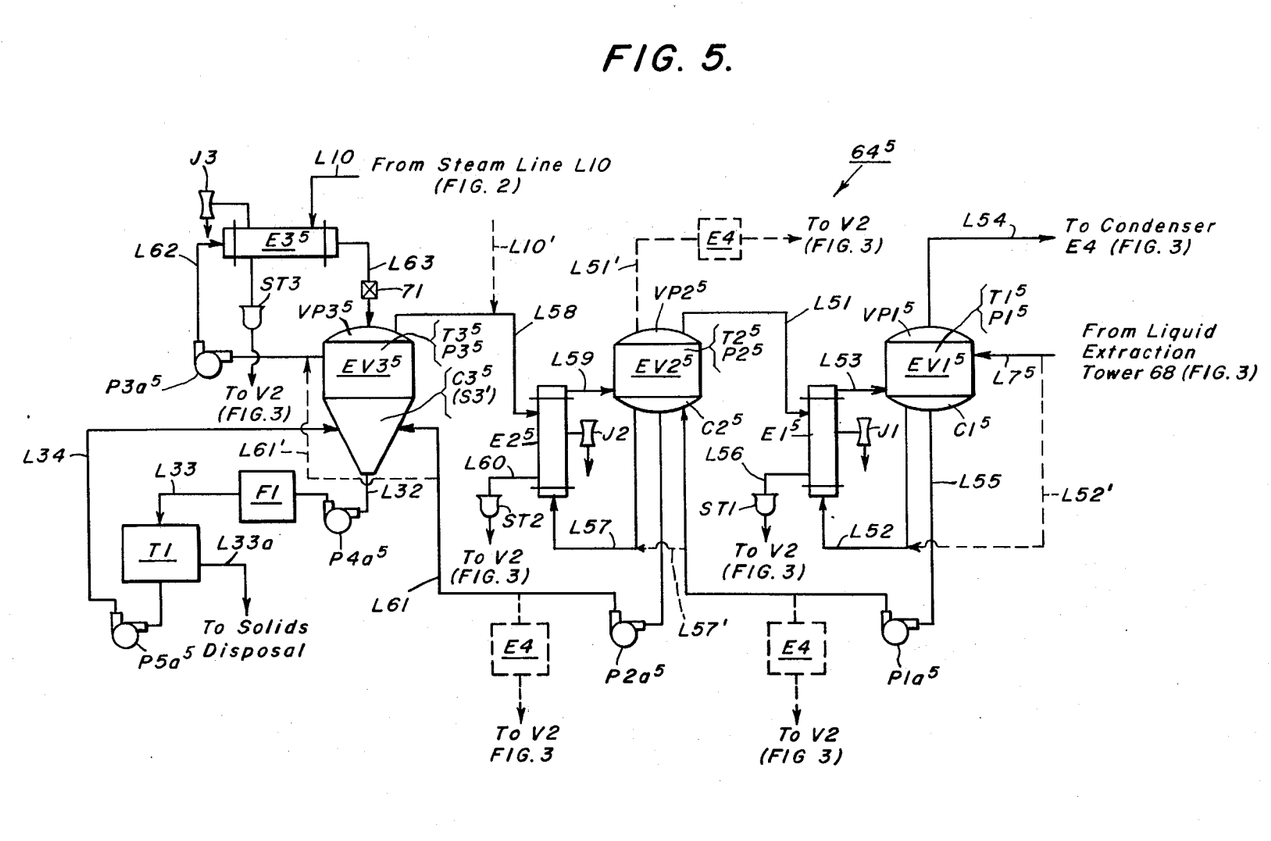
FIG. 5 is a view similar to FIG. 3 of a further alternative embodiment of the improved and novel apparatus and showing backward flow of the waste fluid through such apparatus.

FIG. 5 shows a further alternative embodiment, an apparatus 64⁵, involving backward flow of the waste fluid through such apparatus 64⁵. In FIG. 5, waste fluid at a temperature of about 160°F enters evaporator EV1⁵ via line L7⁵ from liquid extraction tower 68 (FIG. 3). Vaporized portion VP2⁵ from evaporator EV2⁵ at a second pressure P2⁵ of about 3.4 psia and a second temperature T2⁵ of about 146°F is conducted by a line L51 from evaporator EV2⁵ to, for example, the shell side of the heat exchanger E1⁵. The waste fluid is conducted from evaporator EV1⁵ (FIG. 5) via line L52 to, for example, the tube side of the heat exchanger E1⁵ where such waste fluid is heated by the vaporized portion VP2⁵ from line L51 at a temperature T1⁵ of about 113°F so that when a line L53 conducts such heated waste fluid from heat exchanger E1⁵ back to the evaporator EV1⁵, such waste fluid is vaporized at such first temperature T1⁵ of about 113°F and at a first pressure P1⁵ of about 1.35 psia. The first vaporized portion VP1⁵ from the waste fluid in evaporator EV1⁵ is conducted by a line L54 to the condenser E4⁵ for condensation to substantially salt-free condensate. A pump P1a⁵ conducts the concentrate C1⁵ formed in evaporator EV1⁵ (FIG. 5) via a line L55 to the second evaporator EV2⁵. The condensate from the second vaporized portion VP2⁵ in the heat exchanger E1⁵ is conducted by a line L56 (FIG. 5) through a steam trap ST1 to the condensate drum V2 (not shown in FIG. 5).

Such concentrate C2⁵ (FIG. 5) is conducted by a line L57 to, for example, the tube side of the second heat exchanger E2⁵. The third vaporized portion VP3⁵ from the evaporator crystallizer EV3⁵ (FIG. 5) moves (at a temperature T3⁵ of about 180°F and a pressure P3⁵ of about 5.3 psia) via a line L58 to, for example, the shell side of the second heat exchanger E2⁵, where the concentrate C2⁵ is heated at a temperature T2⁵ of about 146°F. Line L59 conducts the heated concentrate C2⁵ back to the second evaporator EV2⁵. In the evaporator EV2⁵ (FIG. 5), the first concentrate C1⁵ mixes with the concentrate in the second evaporator EV2⁵. Such mixture forms the second concentrate C2⁵ and is fed by a line L57 (FIG. 5) to the heat exchanger E2⁵. Such mixture is then heated in heat exchanger E2⁵ and vaporizes at a second pressure P2⁵ of about 3.4 psia and at the second temperature T2⁵ of about 146°F in the evaporator EV2⁵ to form the second vaporized portion VP2⁵.

The second vaporized portion VP2⁵ (FIG. 5) may be conducted by the solid line L51 in FIG. 5 as heretofore described to, for example, the shell side of the first heat exchanger E1⁵ or as shown by the dotted line L51' (FIG. 5) to the condenser E4 and thence to the condensate drum V2 shown in FIG. 3. As in the prior cases, the condensate from the heat exchanger E2⁵ is fed via a line L60 (FIG. 5) through a steam trap St2 to the condensate drum V2 shown in FIG. 3.

Third Stage

A pump P2a⁵ conducts the second concentrate C2⁵ via line L61 (FIG. 5) to the evaporator crystallizer EV3⁵. Steam at about 200°F from steam line L10 (FIGS. 2, 3, 5) and at a pressure of about 13.8 psia is fed via such steam line L10 from the rotary continuous quencher 32 (FIG. 3) into, for example, the shell side of the third heat exchanger E3⁵. A pump P3a⁵ (FIG. 5) pumps the concentrate in the evaporator crystallizer C3⁵ (formed in the evaporator EV3⁵ by the mixture of concentrate C2⁵ and the concentrate in the evaporator EV3⁵) in the evaporator crystallizer EV3⁵ via a line L62 (FIG. 5) into, for example, the tube side of the third heat exchanger E3⁵ where such third concentrate C3⁵ is raised to a temperature of about 187°F and re-enters the evaporator crystallizer EV3⁵ by line L63 from heat exchanger E3⁵. In the evaporator crystallizer EV3⁵ (FIG. 5), the third concentrate C3⁵ mixes with the second concentrate C2⁵ and the mixture is vaporized at a temperature T3⁵ of about 180°F and at a pressure P3⁵ of about 5.3 psia to form either the saturated solution S3' of corrosive salts or the third concentrate C3⁵ and also to form the third vaporized portion VP3⁵, which vaporized portion VP3⁵ is conducted by the line L58 to the heat exchanger E2⁵.

The saturated solution disposal loop shown in the lower left-hand portion of FIG. 5 is essentially the same as that shown in the lower right-hand portion of FIG. 3.

Alternatively, as shown in FIG. 5, the waste fluid can be fed via dotted line L52' directly to line L52; the first concentrate C1⁵ can be fed via line L55 to line to L57'; the second concentrate C2⁵ can be fed via line L61 to L61' to line L62; and the steam from steam line L10 (FIG. 3) can be fed directly via line L10' to line L58 (when the third evaporator EV3⁵ is not in operation or employed).

In FIG. 3, alternatively the waste fluid can be fed by dotted line L7³ directly to the first evaporator EV1; the first concentrate can be fed via line L20³ to the second evaporator EV2; and the second concentrate C2 can be fed via line L26³ to line L27.

Alternatively, the apparatus and method of this invention can be employed with a batch type coking apparatus by the use of steam accumulator (not shown).

Alternatively, other evaporators may be employed having:

a. the heating medium separated from the evaporating liquid by tubular heating surfaces (FIGS. 1–5);

b. the heating medium confined by coils, jackets, double walls, flat plates, and the like.

Usable evaporator types are as follows:

a. forced circulation (FIGS. 3, 5);

b. submerged tube forced circulation;

c. Oslo-type crystallizer;

d. short tube vertical;

e. propeller calendria;

f. long tube vertical with separated entrainment outlet;

g. recirculating long tube vertical;

h. falling film;

i. horizontal tube evaporator; and j. wiped film.

SUMMARY OF THE ACHIEVEMENTS OF THE OBJECTS OF THE INVENTION

It will be recognized by those skilled in the art that the objects of this invention have been achieved by providing an improved (frontward and backward flow) apparatus 64 (FIG. 3), 64⁴ (FIG. 4), and 64⁵ (FIG. 5) for and a method of purifying waste fluid (containing waste water and corrosive salts) with waste steam from a continuous coke quenching apparatus 32 or batch type coke quenching apparatus (not shown) to produce substantially salt-free condensate, which improved apparatus 64 (FIGS. 3-5), etc. and method utilize the heretofore wasted steam from a continuous coke quenching apparatus 32 to produce the salt-free condensate; produce a substantially salt-free condensate for use in boilers or as coke quenching fluid; eliminate the corrosive atmosphere polluting effluent produced in coke quenching operations by the use of contaminated waste fluid from the coke producing operation as a coke quenching fluid; eliminate suspended tar particles from the waste fluid; eliminate benzene, tar acids, tar bases, and oil from the waste fluid; eliminate $CO_2$, $NH_3$, $H_2S$, benzene, and the like from the waste fluid; and eliminate corrosive salts from the waste fluid.

While in accordance with the patent statutes, preferred and alternative embodiments of this invention have been illustrated and described in detail, it is to be particularly understood that the invention is not limited thereto or thereby.

We claim:

1. A backward flow method of purifying solids containing liquiform waste including waste water and corrosive salts, produced in a coke producing apparatus, with waste steam from said coke quenching apparatus to produce substantially salt-free condensate, said method comprising the steps of:
   a. vaporizing said waste fluid at a first predetermined temperature at a first predetermined pressure to vaporize a portion of said waste fluid and to concentrate the corrosive salts in the residual waste fluid to form a concentrate;
   b. heating said concentrate in indirect heat exchange relationship with said waste steam at a second predetermined temperature at a second predetermined pressure;
      1. said second predetermined pressure being greater than said first predetermined pressure; and
   c. vaporizing said concentrate at said second predetermined temperature at said second predetermined pressure to vaporize a second portion of said concentrate and to concentrate the corrosive salts to form a second concentrate; and
   d. condensing said second vaporized portion and said steam to form substantially salt-free condensate; and
   e. utilizing said substantially salt-free condensate in coke quenching, thereby eliminating contamination of the atmosphere with said liquiform waste if said waste were employed to quench said coke in said coke quenching apparatus, and utilizing said waste steam for its heat energy.

2. The backward flow method recited in claim 1 including the prior step of settling out suspended tars in said waste fluid.

3. The backward flow method recited in claim 1 including the prior step of contacting said waste fluid with either light oil or benzene to remove tar particles suspended as droplets in said waste fluid.

4. The backward flow method recited in claim 1 including the prior step of extracting phenol, tar acids and tar bases from said waste fluid.

5. The backward flow method recited in claim 1 including the step of distilling off benzene, $CO_2$, $H_2S$, and $NH_3$ from the condensate of said second heated vaporized portion to form a substantially pure condensate.

6. The backward flow method recited in claim 1 including the step of further concentrating said corrosive salts to form a saturated solution.

7. The backward flow method recited in claim 6 including the step of crystallizing said saturated solution of said corrosive salts.

8. The backward flow method recited in claim 1 including the steps of:
   a. heating said second concentrate in heat exchange relationship with said waste steam at a third predetermined temperature at a pressure greater than a third predetermined pressure;
      1. said third predetermined pressure being greater than said second predetermined pressure; and
   b. vaporizing said second concentrate at said third predetermined temperature at said third predetermined pressure to vaporize a third portion of said second concentrate and to concentrate the corrosive salts to form a third concentrate; and
   c. condensing said third vaporized portion and said waste steam to form substantially salt-free condensate.

9. The method recited in claim 8 including the step of further concentrating said corrosive salts in said third concentrate to form a saturated solution of said corrosive salts.

10. The method recited in claim 9 including the step of crystallizing said saturated solution of said corrosive salts.

11. A backward flow apparatus for the backward flow purification of liqueform waste containing waste water and corrosive salts, produced in a coke producing apparatus and normally utilized to quench coke in a coke quenching apparatus, with waste steam from a continuous coke quenching apparatus to produce substantially pure salt free condensate, said apparatus having
   a. vaporizing means for vaporizing said waste fluid at a first predetermined temperature at a first predetermined pressure to vaporize a portion of said liquiform waste and to concentrate the corrosive salts to form a concentrate;
   b. an indirect heat exchanger for heating said concentrate in heat exchange relationship with either high temperature steam or said waste steam, at a second predetermined temperature at a second predetermined pressure,
      1. said second predetermined pressure being greater than said first predetermined pressure;
   c. another vaporizing means for vaporizing said concentrate at said second predetermined temperature at said second predetermined pressure to vaporize a second portion of said concentrate and to concentrate the corrosive salts to form a second concentrate;

d. condensing means for condensing said second vaporized portion and said steam to form substantially salt-free condensate; and e. means for utilizing said substantially salt-free condensate for coke quenching, thereby eliminating the disposal of said liqueform waste and the contamination of the atmosphere with said waste if said waste were employed to quench said coke in said coke quenching apparatus, and utilizing said waste steam for its heat energy.

12. The backward flow apparatus recited in claim 11 and having means for settling out suspended tars in said waste fluid.

13. The backward flow apparatus recited in claim 11 and having means for contacting said liqueform waste with either light oil or benzene to remove tar particles suspended as droplets in said waste.

14. The backward flow apparatus recited in claim 11 and having means for extracting phenol, tar acids and tar bases from said liqueform waste.

15. The backward flow apparatus recited in claim 11 and having means for distilling off benzene, $CO_2$, $H_2S$, and $NH_3$ from said second vaporized portion to form a substantially pure condensate.

16. The backward flow apparatus recited in claim 11 and having means for concentrating said corrosive salts to form a saturated solution of said corrosive salts.

17. The backward flow apparatus recited in claim 16 and having means for crystallizing said saturated solution of said corrosive salts.

18. The backward flow apparatus recited in claim 11 and having:

a. a second indirect heat exchanger for heating said second concentrate in heat exchange relationship with said waste steam at a third predetermined temperature at a pressure greater than a third predetermined pressure;

1. said third predetermined pressure being greater than said second predetermined pressure;

b. a second vaporizing means for vaporizing said second concentrate at said third predetermined temperature at said third predetermined pressure to vaporize a third portion of said second concentrate and to concentrate the corrosive salts to form a third concentrate; and c. condensing means for condensing said third vaporized portion and said waste steam to form substantially salt-free condensate.

19. The backward flow apparatus recited in claim 18 and having means for further concentrating said corrosive salts in said third concentrate to form a saturated solution of said corrosive salts.

20. The backward flow apparatus recited in claim 19 and having means for crystallizing said saturated solution of said corrosive salts.

* * * * *